United States Patent
Hintze-Brüning et al.

(10) Patent No.: US 7,220,298 B2
(45) Date of Patent: *May 22, 2007

(54) ANTI-CORROSIVE MIXTURE AND COATING SUBSTANCES CONTAINING SAID ANTI-CORROSIVE MIXTURE

(75) Inventors: Horst Hintze-Brüning, Münster (DE); Lothar Jandel, Münster (DE); Ralf Neuhaus, Drensteinfurt (DE); Markus Ruckpaul, Münster (DE); Marc Bäumer, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/497,642

(22) PCT Filed: Jan. 15, 2003

(86) PCT No.: PCT/EP03/00436

§ 371 (c)(1),
(2), (4) Date: Jun. 4, 2004

(87) PCT Pub. No.: WO03/062328

PCT Pub. Date: Jul. 31, 2003

(65) Prior Publication Data

US 2005/0065269 A1  Mar. 24, 2005

(30) Foreign Application Priority Data

Jan. 24, 2002  (DE)  ............... 102 02 545

(51) Int. Cl.
- *C04B 9/02* (2006.01)
- *H01B 5/00* (2006.01)
- *H01B 1/02* (2006.01)
- *H01B 1/06* (2006.01)

(52) U.S. Cl. ............... 106/14.44; 106/14.11; 252/500; 252/521.3; 252/521.5; 252/521.6

(58) Field of Classification Search ............. 106/14.44, 106/14.11; 252/500, 521.3, 521.5, 521.6
See application file for complete search history.

(56) References Cited

U.S. PATENT DOCUMENTS

| | | | |
|---|---|---|---|
| 3,083,308 A * | 3/1963 | Baumann | 310/57 |
| 4,086,096 A | 4/1978 | McLeod | |
| 4,119,763 A | 10/1978 | Blair | |
| 4,374,965 A * | 2/1983 | Dickie et al. | 525/510 |
| 4,724,172 A * | 2/1988 | Mosser et al. | 427/383.5 |
| 4,837,253 A | 6/1989 | Mansell et al. | |
| 4,966,630 A * | 10/1990 | Okuda | 106/426 |
| 5,612,093 A | 3/1997 | Braig et al. | |
| 5,726,225 A * | 3/1998 | Braig et al. | 524/83 |
| 6,083,308 A | 7/2000 | Fletcher | |
| 6,126,730 A | 10/2000 | Yoshida et al. | |
| 6,176,907 B1 | 1/2001 | Glausch | |
| 6,398,861 B1 * | 6/2002 | Knox | 106/404 |
| 6,579,472 B2 * | 6/2003 | Chung et al. | 252/389.31 |
| 6,596,061 B1 * | 7/2003 | Rentschler | 106/14.05 |
| 6,599,351 B1 * | 7/2003 | Rentschler et al. | 106/14.12 |
| 2003/0175541 A1 * | 9/2003 | Lorenz et al. | 428/546 |
| 2004/0084657 A1 * | 5/2004 | Pawlik et al. | 252/500 |
| 2005/0003082 A1 * | 1/2005 | Roelofs et al. | 427/180 |
| 2005/0228113 A1 * | 10/2005 | Baumer et al. | 524/500 |

FOREIGN PATENT DOCUMENTS

| | | | |
|---|---|---|---|
| DE | 3007655 | * | 9/1981 |
| DE | 19623268 | | 12/1996 |
| DE | 10022075 | | 11/2001 |
| EP | 0551063 A1 | | 7/1993 |
| EP | 0760387 A1 | | 3/1997 |
| WO | WO03/062327 | | 7/2003 |

* cited by examiner

Primary Examiner—J. A. Lorengo
Assistant Examiner—Patricia L. Hailey

(57) ABSTRACT

A corrosion inhibiting mixture comprising
(A1) corrosion-inhibiting pigments,
(A2) amorphous silica modified with metal ions, and
(A3) at least one compound of the general formula I:

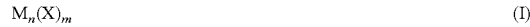

$$M_n(X)_m \qquad (I)$$

in which the variables and indices have the following meanings:

M is at least one central atom selected from the group of Lewis acceptors,

X stands for Lewis donor ligands having at least one bridging atom selected from elements of main groups 5 and 6 of the periodic table of the elements, n is from 1 to 500, and m is from 3 to 2000;

coating materials comprising said mixture and their use as coil coating materials.

20 Claims, No Drawings

ANTI-CORROSIVE MIXTURE AND COATING SUBSTANCES CONTAINING SAID ANTI-CORROSIVE MIXTURE

CROSS REFERENCE TO RELATED APPLICATIONS

This application is a National Phase Application of Patent Application PCT/EP03/00436 filed on 17 Jan. 2003, which claims priority to DE 102 02 545.2, filed on 24 Jan. 2004.

The present invention relates to a novel corrosion inhibiting mixture. The present invention also relates to the use of the novel corrosion inhibiting mixture for the corrosion protection of coils. The present invention further relates to novel coating materials, especially coil coating materials, which comprise the novel corrosion inhibiting mixture. The present invention relates not least to the use of the novel coating materials, especially the coil coating materials, for producing corrosion protection coatings for coils.

Coil coating materials, which are applied predominantly by roller application using contrarotating rolls to steel coils (strips or long sheets), especially galvanized steel coils, or aluminum coils, are known. Since the processing of the metal does not take place until after the coating process, the coatings need to have extremely high mechanical integrity. Typical drying times are from 20 to 40 seconds at a metal temperature of from 200 to 260° C. The coated coils are used customarily in the architectural sector for producing ceiling and wall elements, doors, pipe insulations, roller shutters or window profiles, in the vehicle sector for producing paneling for caravans or truck bodies, and in the household sector for producing profile elements for washing machines, dishwashers, freezers, fridges or ranges (cf. Römpp Lexikon Lacke und Druckfarben, Georg Thieme Verlag, Stuttgart, New York, 1998, "coil coating", page 55, and "coil coating materials", page 116).

In order to simplify further the production of motor vehicles from a technical standpoint, and to make it more economic, it is desired to use preformed, coated profile elements and moldings for producing vehicle bodies. For this to be possible, however, it is necessary that, with the preformed, coated profile elements and moldings, further improvements be made in corrosion protection for the bodies, so that corrosion protection measures, such as the flooding of cavities with wax, become superfluous. A further requirement is that the corrosion protection afforded by cathodically deposited and heat-cured electrocoats on coils be improved further, or that it be possible to do without the electrocoats entirely.

Additionally, it is necessary that the coated coils and the profile elements and moldings produced from them, particularly for use in the automobile sector, can be spot welded.

It is an object of the present invention to provide novel coil coating materials which give coatings possessing extremely high mechanical integrity and particularly good corrosion protection, so that it is possible if necessary to do without cathodically deposited and heat-cured electrocoats. Moreover, it is intended that the particularly good corrosion protection effect be achievable even without heavy metals. Further, where necessary, the novel coil coating materials should be easy to make spot weldable by addition of electrically conductive pigments without detriment to their other, excellent performance properties.

The invention accordingly provides the novel corrosion inhibiting mixture comprising
(A1) corrosion-inhibiting pigments,
(A2) amorphous silica modified with metal ions, and
(A3) at least one compound of the general formula I:

$$M_n(X)_m \quad (I)$$

in which the variables and indices have the following meanings:
M is at least one central atom selected from the group of Lewis acceptors,
X stands for Lewis donor ligands having at least one bridging atom selected from elements of main groups 5 and 6 of the periodic table of the elements,
n is from 1 to 500, and
m is from 3 to 2000.

Below, the novel corrosion inhibiting mixture (A) is referred to as "inventive mixture".

The invention further provides the novel coating materials, especially coil coating materials, which comprise the inventive mixture and are referred to below as "coating materials of the invention".

In the light of the prior art it was surprising and unforeseeable for the skilled worker that the object on which the present invention was based could be achieved by means of the inventive mixture and by means of the coating materials of the invention. It was particularly surprising that the corrosion protection of coils afforded by the inventive mixture was comparable with that of cathodically deposited and heat-cured electrocoats. Even more surprising was that the mixtures of the invention could be used together with electrically conductive pigments with no loss of the outstanding corrosion protection in order to provide for spot weldability of the coatings of the invention produced from the coating materials of the invention. Moreover, it was possible to overcoat the corrosion protection coatings of the invention with other coating materials, especially cathodic electrocoat materials, without any problems.

The first essential constituent of the inventive mixture is at least one corrosion-inhibiting pigment (A1), for which it is possible to use the customary and known corrosion-inhibiting pigments. Preferably, the corrosion-inhibiting pigments (A1) are selected from the group consisting of zinc phosphate, zinc metaborate, and barium metaborate monohydrate, especially zinc phosphate and barium metaborate monohydrate.

Zinc phosphate is a commercial compound and is sold, for example, under the brand name Sicor® ZNP/S. Barium metaborate monohydrate is likewise a commercial compound and is sold, for example, under the brand name Butrol® 11M2.

The second essential constituent of the inventive mixture is at least one amorphous silica (A2) modified with metal ions. Said ions are preferably selected from the group consisting of alkali metal ions, alkaline earth metal ions, especially calcium ions, scandium ions, yttrium ions and lanthanum ions, lanthanide ions, and zinc ions and aluminum ions. Preference is given to employing calcium ions.

Amorphous silica modified with calcium ions (A2) is also a commercial product and is sold, for example, under the brand name Shieldex®.

The third essential constituent of the inventive mixture is at least one compound of the general formula I. The compounds I can be monomeric (mononuclear) or dimeric, oligomeric or polymeric (polynuclear).

In the general formula I, the variable M stands for at least one central atom selected from the group of Lewis acceptors. It is preferably selected from the group consisting of aluminum, titanium, and zirconium. Preferably, M is titanium.

In the general formula I, the variable X stand for Lewis donor ligands having at least one bridging atom selected from the elements of main groups 5 and 6 of the periodic table of the elements. The bridging atom is preferably selected from the group consisting of nitrogen, phosphorus, oxygen, and sulphur atoms, especially phosphorus and oxygen atoms.

Lewis acceptors and Lewis donors are Lewis acids and bases in the sense of the Lewis acid-base theory.

In the general formula I the index n stands for a number, particularly an integer, from 1 to 500, preferably from 1 to 100, more preferably from 1 to 50, with particular preference from 1 to 20, and in particular from 1 to 20. The index m stands for a number, particularly an integer, from 3 to 2000, preferably from 3 to 1000, more preferably from 3 to 500, with particular preference from 3 to 100, and in particular from 3 to 50.

Examples of highly suitable compounds I are monomeric, dimeric, oligomeric or polymeric alkoxides of aluminum or titanium, such as $Al_3(O\text{-tert-butyl})_6$, $Al_4(O\text{-isopropyl})_{12}$, or $Ti(O\text{-ethyl})_4$.

Examples of especially suitable compounds of the general formula I are compounds of the general formula II:

$$RO\text{-}M[\text{-}O\text{---}P(O)(OH)\text{---}O\text{---}P(O)(OR^1)_2]_3 \cdot HP(O)(OR^2)_2 \quad \text{(II)}$$

in which the variables R, $R^1$, and $R^2$ stand independently of one another for aliphatic and cycloaliphatic radicals and M is as defined above and is selected in particular from the group consisting of aluminum, titanium, and zirconium. With particular preference, M is titanium.

In the general formula II the variables R, $R^1$, and $R^2$ stand independently of one another for aliphatic and cycloaliphatic, especially aliphatic, radicals. The aliphatic radicals preferably contain from 3 to 20 carbon atoms. Examples of suitable aliphatic radicals are propyl, isopropyl, butyl, sec-butyl, isobutyl, tert-butyl, n-pentyl, isoamyl, n-hexyl, n-heptyl, octyl, isooctyl, nonyl, decyl, undecyl, dodecyl, tridecyl, tetradecyl, pentadecyl, hexadecyl, heptadecyl, octadecyl, nonadecyl, and eicosanyl, preferably isopropyl, octyl and isooctyl. With particular preference R is isopropyl, $R^1$ is octyl, and $R^2$ is isooctyl.

With very particular preference, therefore, use is made of the adduct of isopropyl tris(dioctylpyrophosphato)titanate with one mole of diisooctyl phosphite as constituent (A3). The adduct is a commercial compound and is sold, for example, under the brand name KEN-REACT® by Kenrich Petrochemicals.

The weight ratio of the constituents (A1), (A2), and (A3) may vary widely and is guided by the requirements of the case in hand. Preferably the constituents (A1), (A2), and (A3) are present in a weight ratio of 1:(0.5 to 1.5, especially 0.8 to 1.2):(0.1 to 2, especially 0.2 to 0.6). The weight ratio may also be 1:(0.5 to 1.5):(0.2 to 0.6) or 1:(0.8 to 1.2):(0.1 to 2). With particular preference the weight ratio is 1:(0.8 to 1.2):(0.2 to 0.6).

The inventive mixture further comprises at least one electrically conductive pigment (A4). It preferably has an at least, and especially, bimodal particle size distribution. The electrically conductive pigment (A4) is preferably selected from the group consisting of elemental silicon and metallic, water-insoluble phosphides, especially consisting of CrP, MnP, $Fe_3P$, $Fe_2P$, $Ni_2P$, $NiP_2$, and $NiP_3$. With particular preference, iron phosphides are employed.

Very particular preference is given to using iron phosphides having a bimodal particle size distribution. Particular preference is given to using a mixture of fine iron phosphides and coarse iron phosphides. Preferably, 90% by weight of the fine iron phosphides have an average particle size of from 3 to 16 µm and 90% by weight of the coarse iron phosphides have an average particle size of from 5 to 22 µm. The fine and coarse iron phosphides are used in a weight ratio of preferably from 1.4:1 to 1:1.4, more preferably from 1.3:1 to 1:1.3, with particular preference from 1.2:1 to 1:1.2, and in particular 1:1.

The iron phosphides are commercial products and are sold, for example, under the brand name Ferrophos® (fine: Ferrophos® HRS 2132; coarse: Ferrophos® HRS 2131).

The amount of consistuent (A4) in the inventive mixture may vary widely. The 25 weight ratio of constituents (A1), (A2), and (A3) on the one hand to (A4) on the other is preferably from 1:20 to 1:5, more preferably from 1:15 to 1:5, with particular preference from 1:12 to 1:6, with very particular preference from 1:10 to 1:7, and in particular from 1:9 to 1:7.

The inventive mixtures can be put to a large number of uses. For instance, they can be used per se for the corrosion protection of moldings made of steel, especially galvanized steel, and aluminum. They are preferably used for corrosion protection of coils, preferably coils of steel, especially galvanized steel, and aluminum.

Alternatively, the inventive mixtures can be added for corrosion protection purposes to customary and known coating materials. These coating materials can be one-component or multicomponent systems, especially two-component systems. The coating materials of the invention may also be formulated on the basis of organic solvents (conventional coating materials) or aqueous media (aqueous coating materials). Alternatively, they may be substantially or completely solvent-free and water-free liquid coating materials (100% systems) or substantially or completely solvent-free and water-free, solid, pulverulent coating materials (powder coating materials). The powder coating materials may also be in the form of aqueous dispersions, also known as powder slurries.

The coating materials of the invention may be cured thermally, with actinic radiation, or both thermally and with actinic radiation. Here and below, actinic radiation means electromagnetic radiation, such as near infrared, visible light, UV radiation or X-rays, especially UV radiation, or corpuscular radiation, such as electron beams. Joint curing with heat and actinic radiation is also referred to by those in the art as dual cure.

The resulting coating materials of the invention comprising the inventive mixture can be used for coating motor vehicle bodies and parts thereof, the interior and exterior of motor vehicles, the inside and outside of buildings, doors, windows, and furniture, and, in the context of industrial coating, for the coating of small parts, coils, containers, packaging, electrical components, and white goods.

This extremely broad usefulness of the inventive mixture and of the coating materials of the invention comprising them represents a particular advantage.

With particular preference, the inventive mixture is added to coil coating materials. The resulting coatings of the invention may likewise be one-component or multicomponent, especially two-component, systems; preferably, they are one-component systems. They can be formulated on the basis of organic solvents or aqueous media. They can also, however, be substantially or completely solvent-free and water-free liquid coating materials (100% systems) or substantially or completely solvent-free and water-free powder coating materials. The powder coating materials can also be in the form of powder slurries. With very particular preference, conventional coating materials of the invention are used.

The coating materials of the invention can be cured thermally, with actinic radiation, or both thermally and with actinic radiation. They are preferably cured thermally. In this context they may be thermally self-crosslinking or externally crosslinking. They are preferably externally crosslinking.

The amount of the inventive mixture in the coating materials of the invention may vary widely and is guided by the requirements of the case in hand.

Preferably, the coating materials of the invention contain constituent (A1) in an amount of 0.1 to 10%, more preferably from 0.3 to 8%, with particular preference from 0.5 to 7%, with very particular preference from 1 to 5%, and in particular from 1.5 to 4% by weight, based in each case on the solids of the coating material of the invention.

Preferably, the coating materials of the invention contain constituent (A2) in an amount of 0.1 to 10%, more preferably from 0.3 to 8%, with particular preference from 0.5 to 7%, with very particular preference from 1 to 5%, and in particular from 1.5 to 4% by weight, based in each case on the solids of the coating material of the invention.

Preferably, the coating materials of the invention contain constituent (A3) in an amount of 0.01 to 5%, more preferably from 0.03 to 4%, with particular preference from 0.05 to 3%, with very particular preference from 0.1 to 2.5%, and in particular from 0.2 to 2% by weight, based in each case on the solids of the coating material of the invention.

Preferably, within these limits, the above-described advantageous weight ratios (A1):(A2):(A3) are set.

Where the coating materials of the invention further comprise constituent (A4), it is present therein in an amount of preferably from 10 to 80%, more preferably from 15 to 75%, with particular preference from 20 to 75%, and in particular from 30 to 75% by weight, based in each case on the solids of the coating material of the invention. In this case it is preferable to use the above-described preferred weight ratios of (A1), (A2) and (A3) on the one hand to (A4) on the other.

Besides the inventive mixture, the coating materials of the invention comprise constituents such as are customary and known in the field of coil coating materials, such as binders, crosslinking agents, organic solvents, and additives.

The binders are preferably selected from the group consisting of random, alternating, and block, linear, branched, and comb addition (co)polymers of ethylenically unsaturated monomers, polyaddition resins and/or polycondensation resins which are curable physically, thermally, with actinic radiation, and both thermally and with actinic radiation. Regarding these terms, refer for further details to Römpp Lexikon Lacke und Druckfarben, Georg Thieme Verlag, Stuttgart, New York, 1998, page 457, "polyaddition" and "polyaddition resins (polyadducts)", and pages 463 and 464, "polycondensates", "polycondensation", and "polycondensation resins".

The binders are preferably selected from the group consisting of (meth)acrylate addition (co)polymers, partially hydrolyzed polyvinyl esters, polyesters, alkyds, polylactones, polycarbonates, polyethers, epoxy resin-amine adducts, polyureas, polyamides, polyimides, and polyurethanes, especially polyesters.

The preparation of polyesters is described, for example, in the standard work Ullmanns Encyklopädie der technischen Chemie, 3rd edition, volume 14, Urban & Schwarzenberg, Munich, Berlin, 1963, pages 80 to 89 and 99 to 105, and also in the following books: "Résines Alkydes-Polyesters" by J. Bourry, Dunod, Paris, 1952, "Alkyd Resins" by C. R. Martens, Reinhold Publishing Corporation, New York, 1961, and "Alkyd Resin Technology" by T. C. Patton, Interscience Publishers, 1962.

The self-crosslinking binders of the thermally curable coating materials of the invention and of the dual-cure coating materials of the invention contain reactive functional groups which are able to undergo crosslinking reactions with groups of their own kind ("with themselves") or with complementary reactive functional groups.

The externally crosslinking binders contain reactive functional groups which are able to undergo crosslinking reactions with complementary reactive functional groups that are present in crosslinking agents (cf. Römpp Lexikon Lacke und Druckfarben, Georg Thieme Verlag, Stuttgart, New York, 1998, "curing", pages 274 to 276, especially page 275).

Examples of suitable complementary reactive functional groups for use in accordance with the invention are assembled in the following overview. In the overview, the variable $R^4$ stands for an acyclic or cyclic aliphatic radical, an aromatic radical and/or an aromatic-aliphatic (araliphatic) radical; the variables $R^5$ and $R^6$ stand for identical or different aliphatic radicals or are linked with one another to form an aliphatic or heteroaliphatic ring.

Overview: Examples of Complementary Reactive Functional Groups

Binder and Crosslinking Agent or

Crosslinking Agent and Binder

| | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR$^4$ |
| —O—(CO)—NH$_2$ | —CH$_2$—OH |
| >NH | —CH$_2$—OR$^4$ |
| | —NH—CH$_2$—OR$^4$ |
| | —NH—CH$_2$—OH |
| | —N(—CH$_2$—OR$^4$)$_2$ |
| | —NH—C(O)—CH(—C(O)OR$^4$)$_2$ |
| | —NH—C(O)—CH(—C(O)OR$^4$)(—C(O)—R$^4$) |
| | —NH—C(O)—NR$^5$R$^6$ |
| | >Si(OR$^4$)$_2$ |

-continued

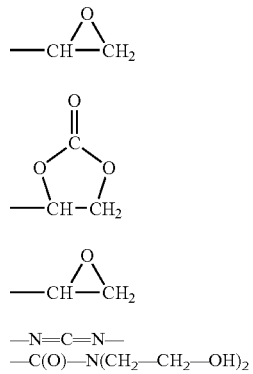

—C(O)—OH

—N=C=N—
—C(O)—N(CH$_2$—CH$_2$—OH)$_2$

The selection of the respective complementary groups is guided on the one hand by the consideration that they should not undergo any unwanted reactions, particularly no premature crosslinking, during the preparation, storage, and application of the coating materials of the invention and/or must not disrupt or inhibit, where appropriate, the actinic radiation cure, and on the other hand by the temperature range within which crosslinking is to take place.

For the coating materials of the invention it is preferred to employ crosslinking temperatures of up to 270° C. Preference is therefore given to employing thio, hydroxyl, N-methylolamino, N-alkoxymethylamino, imino, carbamate, allophanate and/or carboxyl groups, preferably hydroxyl or carboxyl groups, on the one hand and, preferably, crosslinking agents containing anhydride, carboxyl, epoxy, blocked isocyanate, urethane, methylol, methylol ether, siloxane, carbonate, amino, hydroxyl and/or beta-hydroxyalkylamide groups, preferably epoxy, beta-hydroxyalkylamide, blocked isocyanate, urethane or alkoxymethylamino groups, on the other.

In the case of self-crosslinking coating materials of the invention the binders contain in particular methylol, methylol ether and/or N-alkoxymethylamino groups.

Complementary reactive functional groups especially suitable for use in the externally crosslinking coating materials of the invention are
carboxyl groups on the one hand and epoxide groups and/or beta-hydroxyalkylamide groups on the other, and also
hydroxyl groups on the one hand and blocked isocyanate, urethane or alkoxymethylamino groups, especially blocked isocyanate groups, on the other.

The functionality of the binders in respect of the reactive functional groups described above may vary very widely and is guided in particular by the target crosslinking density and/or by the functionality of the particular crosslinking agents employed. In the case of carboxyl-containing binders, for example, the acid number is preferably from 10 to 100, more preferably from 15 to 80, with particular preference from 20 to 75, with very particular preference from 25 to 70, and in particular from 30 to 65 mg KOH/g. Or, in the case of hydroxyl-containing binders, the OH number is preferably from 15 to 300, more preferably from 20 to 250, with particular preference from 25 to 200, with very particular preference from 30 to 150, and in particular from 35 to 120 mg KOH/g. Or, in the case of binders containing epoxide groups, the epoxide equivalent weight is preferably from 400 to 2500, more preferably from 420 to 2200, with particular preference from 430 to 2100, with very particular preference from 440 to 2000, and in particular from 440 to 1900.

The complementary functional groups described above can be incorporated into the binders by the customary and known methods of polymer chemistry. This can be done, for example, by incorporating monomers which carry the corresponding reactive functional groups, and/or by means of polymer-analogous reactions.

The binders of the dual-cure coating materials of the invention and of the coating materials of the invention that are curable with actinic radiation alone further contain on average per molecule at least one, preferably at least two, group(s) having at least one bond which can be activated with actinic radiation.

In the context of the present invention, a bond which can be activated with actinic radiation is a bond which, on exposure to actinic radiation, becomes reactive and, with other activated bonds of its kind, undergoes polymerization reactions and/or crosslinking reactions which proceed in accordance with radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds.

In the dual-cure coating materials of the invention it is, however, also possible to employ mixtures of binders curable by means of heat alone and binders curable solely with actinic radiation.

The amount of the above-described binders in the coating materials of the invention may vary widely and is guided by the requirements of the case in hand, in particular by the functionality of any crosslinking agents used. Preferably, the binders are employed in an amount so as to give a pigment/binder ratio >2.4:1, more preferably >2.6:1, and with particular preference >2.8:1. With very particular preference the pigment/binder ratio is from 2.9:1 to 3.2:1.

Examples of suitable crosslinking agents are amino resins, as described, for example, in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A1 or EP-B-0 245 700 A1, and in the article by B. Singh and coworkers "Carbamylmethylated Melamines, Novel Crosslinkers for the Coatings Industry", in Advanced Organic Coatings Science and Technology Series, 1991, volume 13, pages 193 to 207, compounds or resins containing carboxyl groups, as described, for example, in the patent DE 196 52 813 A1, compounds or resins containing epoxide groups, as described, for example, in the patents EP 0 299 420 A1, DE 22 14 650 B1, DE 27 49 576 B1, U.S. Pat. No. 4,091,048 A1 or U.S. Pat No. 3,781 379 A1, nonblocked and blocked polyisocyanates, as described, for example, in the patents U.S. Pat. No. 4,444,954 A1, DE 196 17 086 A1, DE 196 31 269 A1, EP 0 004 571 A1 or EP 0 582 051 A1, and/or tris(alkoxycarbonylamino)triazines, as described in the patents U.S. Pat. No. 4,939,213 A1, U.S. Pat. No. 5,084,541 A1, U.S. Pat. No. 5,288,865 A1 or EP0604 922 A1.

With particular preference, blocked polyisocyanates are used. In particular, use is made of the polyisocyanates blocked with the blocking agents known from the German patent application DE 199 14 896 A1, column 12 line 13 to column 13 line 2, especially polyisocyanates blocked with caprolactam.

The amount of the crosslinking agent in the coating materials of the invention may vary widely and is guided by the requirements of the case in hand, in particular by the functionality of the binders used.

Particular preference is given to using one-component systems composed of hydroxyl-containing polyesters and caprolactam-blocked polyisocyanates. These one-component systems are commercial products and are sold, for example, under the brand name Vesticoat® EPUB 877.

The amount of crosslinking agents and binders in the coating materials of the invention is preferably from 10 to 60%, more preferably from 12 to 55%, with particular preference from 15 to 50%, and in particular from 15 to 45% by weight, based in each case on the solids of the coating material of the invention.

The coating material of the invention may comprise an organic solvent. Examples of customary and known solvents are described in D. Stoye and W. Freitag (eds.), "Paints, Coatings and Solvents", 2nd, completely revised edition, Wiley-VCH, Weinheim, N.Y., 1998, "14.9. Solvent Groups", pages 327 to 373. In the coating material of the invention they are used preferably in an amount of from 5 to 50% by weight, in particular from 5 to 40% by weight, based on the coating material of the invention.

The coating material of the invention not least comprises at least one typical coatings additive selected from the group consisting of inorganic and organic additives.

Examples of suitable typical coatings additives are color and/or effect pigments, fillers, nanoparticles, reactive diluents for the thermal cure or the actinic radiation cure, rheological aids, UV absorbers, light stabilizers, radical scavengers, radical polymerization initiators, thermal crosslinking catalysts, photoinitiators and photocoinitiators, slip additives, polymerization inhibitors, defoamers, emulsifiers, devolatilizers, wetting agents, dispersants, adhesion promoters, leveling agents, film forming auxiliaries, rheology control additives (thickeners), flame retardants, siccatives, driers, antiskinning agents, other corrosion inhibitors, waxes, and flatting agents, such as are known from the textbook "Lackadditive" by Johan Bieleman, Wiley-VCH, Weinheim, N.Y., 1998, or the German patent application DE 199 14 896 A1, column 13 line 56 to column 15 line 54.

Examples of especially suitable additives are silylamines, such as bis(trimethylsilyl)amine, which is sold under the brand name Aerosil® 812 S, epichlorohydrins, such as bisphenol A epichlorohydrin, which is sold under the brand name Epikote® 834, a self-crosslinking urethane resin, which is sold under the brand name Desmodur® VPLS 2253, and dibutyltin dilaurate.

The preparation of the coating materials of the invention has no special features as far as its method is concerned but instead takes place by the mixing of the constituents described above. This can be done using mixing equipment such as stirred tanks, dissolvers, including inline dissolvers, bead mills, stirrer mills, static mixers, toothed wheel dispersers or extruders. Where appropriate, it is carried out with exclusion of actinic radiation in order to prevent damage to the coating material of the invention which is curable solely or additionally with actinic radiation. In the course of preparation, the individual constituents of the inventive mixture can be incorporated separately. Alternatively, the inventive mixture can be prepared separately and mixed with the other constituents. Preferably, the individual constituents of the inventive mixture are incorporated separately.

The coating materials of the invention are outstandingly suitable for coil coating. Coil coating starts from a coil of metal which has conventionally been cleaned, degreased, passivated, chemically treated, rinsed, and dried. The metal coil can be coated on one or both sides.

Suitable metals are all those from which it is possible to form coils which are equal to the mechanical, chemical, and thermal stresses of coil coating. Highly suitable metal coils are those based on aluminum or iron. In the case of iron, cold-rolled steels, electrolytically zinc-plated steels, hot-dip galvanized steels, or stainless steels are especially suitable. Preferably, the metal sheets of the coils have a thickness of from 200 μm to 2 mm.

For coil coating, the metal coil passes through a coil coating line, such as is described, for example, in Römpp Lexikon Lacke und Druckfarben, Georg Thieme Verlag, Stuttgart, N.Y., 1998, page 55, "coil coating", or in the German patent application DE 196 32 426 A1, at a speed adapted to the application and curing properties of the coating materials of the invention that are employed. The speed may therefore vary very widely from one coating process to another. It is preferably from 10 to 150, more preferably from 12 to 120, with particular preference from 40 to 100, with very particular preference from 16 to 80, and in particular from 20 to 70 m/min.

The coating materials of the invention may be applied in any desired manner; for example, by spraying, flowcoating or roller coating. Of these application techniques, roller coating is particularly advantageous and is therefore used with preference in accordance with the invention.

Each application step in roller coating may be conducted using two or more rolls. Preference is given to the use of from two to four, and especially two, rolls.

In roller coating, the rotating pickup roll dips into a reservoir of the coating material of the invention and so picks up the coating material to be applied. This coating material is transferred by the pickup roll, directly or via at least one transfer roll, to the rotating application roll. From this latter roll, the coating material is transferred onto the coil by means of codirectional or counterdirectional contact transfer.

Alternatively, the coating material of the invention may be pumped directly into a gap or nip between two rolls, this being referred to by those in the art as nip feed.

In accordance with the invention, counterdirectional contact transfer, or the reverse roller coating process, is of advantage and is therefore employed with preference.

In roller coating, the peripheral speeds of the pickup roll and application roll may vary very greatly from one coating process to another. The application roll preferably has a peripheral speed which is from 110 to 125% of the coil speed, and the pickup roll preferably has a peripheral speed which is from 20 to 40% of the coil speed.

The coating materials of the invention are preferably applied in a wet film thickness such that curing of the coating films results in corrosion protection coatings which have a dry film thickness of from 4 to 12 µm, more preferably from 5 to 10 µm, with particular preference from 5 to 9.5 µm, and in particular from 6 to 9 µm.

The application methods described above can be employed with the coating materials with which the corrosion protection coatings of the invention are overcoated, except where they are powder coating materials or electrocoat materials, for which the customary and known, special application methods are used, such as electrostatic powder spraying in the case of low-speed coils or the powder cloud chamber process in the case of high-speed coils, and cathodic electrodeposition coating.

In the case of heat curing, heating of the coating films of the invention takes place preferably by means of convective heat transfer, irradiation with near or far infrared and/or, in the case of iron-based coils, by means of electrical induction. The maximum substrate temperature is preferably 270° C. and in particular 260° C.

The heating time, i.e., the duration of the heat cure, varies depending on the coating material of the invention that is used. It is preferably from 10 s to 2 min.

Where use is made substantially of convective heat transfer, forced air ovens with a length of from 30 to 50 m, in particular from 35 to 45 m, are required at the preferred coil running speeds. The temperature of the forced air is preferably 350° C.

Thermal curing of the coating films of the invention may also be assisted by exposure to actinic radiation.

Alternatively, curing may take place with actinic radiation alone, as is described, for example, in the German patent application DE 198 35 206 A1.

Curing with actinic radiation is carried out using the customary and known radiation sources and optical auxiliary measures. Examples of suitable radiation sources are flashlights from the company VISIT, high or low pressure mercury vapor lamps, which may have been doped with lead in order to open a radiation window of up to 405 nm, or electron beam sources. The arrangement of these sources is known in principle and can be adapted to the circumstances of the workpiece and the process parameters.

The curing methods described above can of course also be used for the coating films with which the corrosion protection coatings of the invention are overcoated.

If two or more coating materials are applied during the coil coating operation, this is carried out in an appropriately configured line, in which two or more application and, where appropriate, curing stations are interposed in series. Alternatively, following application and curing of the first coating material, i.e., the coating material of the invention, the coated coil is wound up again and is then provided on one or both sides with second, third, etc. coatings in a second, third, etc. coil coating line.

Following the production of the coated coils, they can be wound up and then processed further at another place; alternatively, they can be processed further as they come directly from the coil coating operation. For instance, they may be laminated with plastics or provided with removable protective films. After cutting into appropriately sized parts, they may be shaped. Examples of suitable shaping methods include pressing and deep drawing.

The resultant coils, profile elements, and moldings are scratch resistant, stable to corrosion, weathering, and chemicals, and can be overcoated with any of a wide variety of coating materials, without problems. It is surprising that there is no need for chromate pretreatment of the metal coils in order to obtain excellent corrosion protection.

The coils coated with the corrosion protection coatings of the invention are therefore outstandingly suitable for applications in automotive construction for the purpose, for example, of producing bodywork parts and bodies, truck bodies, and caravan paneling, in the household appliance sector for producing, for example, washing machines, dishwashers, driers, fridges, freezers or ranges, in the lighting sector for producing lights for interior and exterior use, or in the interior and exterior architectural sector, for producing, for example, ceiling and wall elements, doors, gates, pipe insulation, roller shutters or window profiles.

EXAMPLES

Example 1

The Preparation of the Inventive Coil Coating Material 1

In a suitable vessel with stirrer, the following components were mixed in this order: 26.9 parts by weight of a one-component system based on a saturated, hydroxyl-containing polyester and a caprolactam-blocked polyisocyanate (Vesticoat® EPUB 877 from Hüls AG), 0.6 part by weight of bis(trimethylsilyl)amine (Aerosil® R 812 S from Degussa), 2.47 parts by weight of silica modified with calcium ions (Shieldex® from Grace Davison), 2.73 parts by weight of zinc phosphate (Sicor® ZNP/S from Waardals Kjemiske Fabriken), 0.99 part by weight of the adduct of isopropyl tris(dioctylpyrophosphato)titanate with one mol of diisooctyl phosphite (KEN-REACT® KR38S from Kenrich Petrochemicals), and 4.5 parts by weight of Solvesso® 150 (ExxonMobil Chemicals). This mixture was predispersed using a dissolver for ten minutes. The resulting mixture was transferred to a bead mill with a cooling jacket, and was mixed with 2 mm SAZ glass beads. The material for milling was milled for 12 minutes to a Hegmann particle size of from 10 to 15 µm. The resulting millbase was then separated from the glass beads.

To the millbase there were added, with stirring, in this order, 3.55 parts by weight of bisphenol A epichlorohydrin (Epikote® 834 from Shell Resins), 1.78 parts by weight of a commercial self-crosslinking urethane resin (Desmodur® VPLS 2253 from Bayer AG), 0.1 part by weight of dibutyltin dilaurate, and 4.26 parts by weight of Solvesso® 150.

With the dissolver running slowly, the resultant mixture was admixed with 52.6 parts by weight of iron phosphide (Ferrophos® HRS 2131 from Nordmann Rasmann). After a further ten minutes, the desired dispersion of the electrically conductive pigments was reached.

The inventive coil coating material 1 was outstandingly suitable for the coil coating process.

Example 2

The Preparation of the Inventive Coil Coating Material 2

Example 1 was repeated but using barium metaborate monohydrate (Butrol® 11 M2 from Buckman) instead of zinc phosphate.

Examples C1 and C2 (Comparative)

The Preparation of the Noninventive Coil Coating Materials C1 and C2

Examples 1 and 2 were repeated but using KEN-RE-ACT® KR38S in neither case.

Examples 3, 4, C3, and C4

The Production of Inventive (Examples 3 and 4) and Noninventive (Examples C3 and C4) Corrosion Protection Coatings For example 3, the inventive coil coating material 1 was used.

For example 4, the inventive coil coating material 2 was used.

For example C3, the noninventive coil coating material C1 was used.

For example C4, the noninventive coil coating material C2 was used.

Using coating rods, the coil coating materials were applied to steel plates of grades Z and ZE with chromate-free pretreatment, in a wet film thickness such that curing thereof in a through-type drier with a forced-air temperature of 350° C. and a substrate temperature of 220° C. gave corrosion protection coatings having a dry film thickness of 8 □m.

The steel plates with the corrosion protection coatings were subjected to the VDA [German automakers association] alternating climate test for 20 days. Measurements were then made of the minimum and maximum incision creep and scribe creep, and of the white rust and red rust. The table gives an overview of the results obtained. The results demonstrate the excellent corrosion protection afforded by the inventive corrosion protection coatings of examples 3 and 4. The white rust and red rust percentages refer to the surface areas of the steel plates affected by rust.

TABLE

The corrosion protection effect of the inventive corrosion protection coatings of examples 3 and 4 and of the non-inventive corrosion protection coatings of examples C3 and C4 after the VDA alternating climate test

| Example and comparative example | Creep (mm) (minimum/maximum) | | White rust (%) | Red rust (%) |
|---|---|---|---|---|
| | incision | scribe | | |
| C3 | 5/7 | 1.5/4 | 30 | 30 |
| C4 | 5/8 | 1.5/4 | 30 | 40 |
| 3 | 2/6 | 0/0.5 | 5 | 30 |
| 4 | 2/6 | 0/0.5 | 0 | 25 |

What is claimed is:

1. A corrosion inhibiting mixture comprising
  (A1) at least one corrosion-inhibiting pigment,
  (A2) amorphous silica modified with metal ions, and
  (A3) at least one compound of the general formula $RO-M[-O-P(O)(OH)-O-P(O)(OR^1)_2]_3 \cdot HP(O)(OR^2)_2$ in which the variables and indices have the following meanings:
  R is a first aliphatic or cycloaliphatic radical;
  $R^1$ is a second aliphatic or cycloaliphatic radical;
  $R^2$ is a third aliphatic or cycloaliphatic radical;
  M is at least one central atom selected from the group of Lewis acceptors; and
  R, $R^1$, and $R^2$ are different.

2. The mixture of claim 1, wherein the at least one corrosion-inhibiting pigment (A1) is selected from the group consisting of zinc phosphate: zinc metaborate, and barium metaborate monohydrate.

3. The mixture of claim 1, wherein the metal ions in the compound (A2) are selected from the group consisting of alkali metal ions, alkaline earth metal ions, scandium ions, yttrium ions, lanthanum ions, and lanthanide ions, and zinc ions and aluminum ions.

4. The mixture as claimed in claim 3, wherein the metal ions are calcium ions.

5. The mixture of claim 1, wherein the central atom M in the compound (A3) is selected from the group consisting of aluminum, titanium, and zirconium.

6. The mixture as claimed in claim 5, wherein M is titanium.

7. The mixture of claim 1, wherein the constituents (A1). (A2), and (A3) are in a weight ratio of 1:(0.5 to 1.5):(0.1 to 2).

8. The mixture of claim 1 further comprising at least one electrically conductive pigment (A4).

9. The mixture as claimed in claim 8, wherein said electrically conductive pigment (A4) has an at least bimodal particle size distribution.

10. The mixture of claim 8, wherein said electrically conductive pigment (A4) is selected from the group consisting of elemental silicon and metallic, water-insoluble phosphides.

11. A coating material comprising the corrosion inhibiting mixture of claim 1.

12. The coating material of claim 11, wherein constituent (A1) is present in an amount of from 0.1 to 10% by weight, based on the solids of the coating material.

13. The coating material of claim 11, wherein constituent (A2) is present in an amount of from about 0.1 to 10% by weight, based on the solids of the coating material.

14. The coating material of claim 11, wherein constituent (A3) is present in an amount of from 0.01 to 5% by weight, based on the solids of the coating material.

15. The coating material of claim 11 further comprising at least one electrically conductive pigment (A4) in an amount of from 10 to 80% by weight, based on the solids of the coating material.

16. The coating material of claim 15, wherein the weight ratio of constituent (A4) on the one hand to constituents (A1), (A2), and (A3) on the other is from 20:1 to 5:1.

17. The coating material of claim 11, wherein the coating material is a one-component system.

18. The coating material of claim 11, wherein the coating material is curable thermally, with actinic radiation, or both thermally and with actinic radiation.

19. The coating material of claim 11, wherein the coating material one of a solvent containing coating material; an aqueous coating material; a solvent-free and water-free liquid coating material; a solvent-free, and water-free, solid pulverulent coating material; or an aqueous dispersion of a powder coating material.

20. The coating material of claim 11, wherein the coating material is a coil coating material.

* * * * *